Feb. 17, 1970  E. P. VILKAS  3,496,327
ARC-SPOT WELDING SYSTEM RESPONSIVE TO RADIATION FROM WELD
FOR CONTROLLING DURATION OF FLOW OF WELDING CURRENT
Filed Nov. 25, 1966
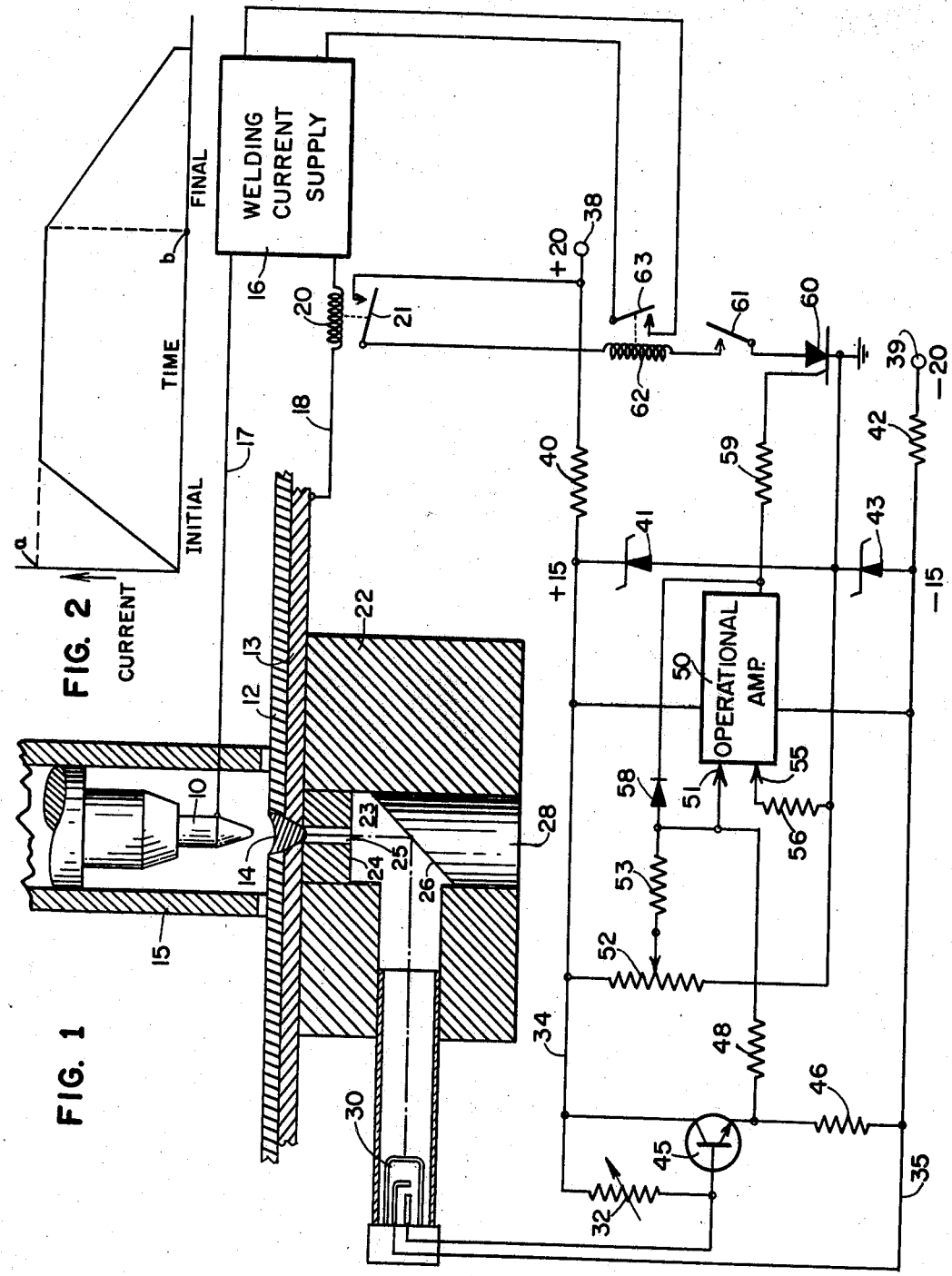
INVENTOR
EUGENE P. VILKAS
BY
Mueller, Aichele & Rauner
ATTYS.

United States Patent Office 3,496,327
Patented Feb. 17, 1970

3,496,327
ARC-SPOT WELDING SYSTEM RESPONSIVE TO RADIATION FROM WELD FOR CONTROLLING DURATION OF FLOW OF WELDING CURRENT
Eugene P. Vilkas, Chicago, Ill., assignor to Welding Research, Inc., Chicago, Ill., a corporation of Illinois
Filed Nov. 25, 1966, Ser. No. 596,988
Int. Cl. B23k 9/10
U.S. Cl. 219—127                                    3 Claims

ABSTRACT OF THE DISCLOSURE

The arc-spot welding system of the invention includes an infrared sensing device responsive to radiation from the weld which operates through an operational amplifier to trigger a control rectifier. The rectifier completes a circuit which actuates the welding current supply to automatically stop the flow of welding current through the welding electrode, and is reset by opening of the rectifier circuit when the welding current terminates.

BACKGROUND OF THE INVENTION

Arc-spot welding is used in many applications to secure two members together. In many cases, a plurality of welds are used in aligned relation to form a seam between the members. In the past, the penetration of each weld was controlled by an operator observing the welding action. To have an operator continually monitor the welding results in objectionable expense, and limits the speed at which the arc-spot welds can be made. Automatic systems have been proposed which provide a fixed welding time for each weld. However, in the event of irregularities in the surface being welded, this has resulted in some of the welds being defective.

SUMMARY OF THE INVENTION

An object of the present invention is to provide an automatic arc-spot welding system wherein the desired weld penetration is provided at each weld.

Another object of the invention is to provide an automatic arc-spot welding system including a device for sensing the radiation from each weld for actuating a control circuit in response to a particular level of radiation to terminate the flow of welding current.

In accordance with the invention, an arc-spot welding system is provided wherein a tungsten welding electrode shielded by an inert gas provides an arc-spot weld which penetrates two workpieces to weld them together. On the back side of the workpieces a sensing device is provided including a back up with an opening through which radiation passes to a mirror which directs the radiation on an infrared sensing device, such as a photocell. The sensing device controls the impedance in a circuit to provide a control voltage which is applied through a preamplifier to an operational amplifier. The operational amplifier responds to a voltage of a particular level to provide fast turn on of a silicon controlled rectifier. The rectifier is in a direct current circuit which includes the contacts of a reset relay and an operating relay. The operating relay controls the welding current supply to initiate the turn off of the current supplied to the tungsten welding electrode, when the weld reaches a predetermined penetration. The current may be turned off gradually to provide post heating of the welded materials. The reset relay is responsive to the welding current and operates to open the direct current circuit to remove potential from the silicon controlled rectifier to reset the same.

The invention is illustrated in the drawing in which:

FIG. 1 is a schematic diagram of the spot welding system of the invention; and

FIG. 2 illustrates the control of the welding current.

DETAILED DESCRIPTION

In the drawing a tungsten arc-spot welding electrode 10 is supported adjacent the workpiece 12, which is in engagement with a second workpiece 13. An inert shielding gas is provided within the cup 15 about the tungsten electrode. Current is supplied from welding current supply 16 through conductor 17 connected to the welding electrode 10, with the return path being the workpieces 12 and 13 through conductor 18 and relay 20. The arc produced between the electrode 10 and the workpieces 12 and 13 heats the metal of the workpieces to provide a pool of molten metal 14.

The radiation from the pool of metal is sensed by a structure including a base 22 for supporting the workpieces. The base 22 has an opening 23 extending vertically therein, with a back up plug 24 positioned therein adjacent the workpiece 13. The back up plug 24 may be made of a material such as copper or stainless steel and is replaceable so that it can be removed without replacing the entire base 22. The back up plate 24 has an opening 25 therein through which radiation from the pool 14 can pass. This radiation strikes the mirror surface 26 formed on the plug 28 at the bottom of the opening 23 in the base 22. The mirror surface may be provided by a polished metal surface on the plug 28, or a separate glass mirror may be provided. The mirror 26 directs the radiation at a right angle onto the radiation sensing device 30 which may be a photocell of known construction adapted to respond to infrared radiation.

The radiation sensing device 30 is connected in series with variable resistor 32 across conductors 34 and 35. A direct current potential is provided across the conductors 34 and 35, which may be of the order of 30 volts. A positive supply potential of the order of 20 volts is applied at terminal 38 and a negative supply potential of the order of 20 volts is applied at terminal 39. The positive potential at terminal 38 is regulated by resistor 40 and Zener diode 41 to provide the potential on conductor 34. Similarly, the negative potential at terminal 39 is regulated by resistor 42 and Zener diode 43 to provide the potential on conductor 35.

The sensing device 30 has a resistance which varies with the amount of radiation applied thereto. As greater radiation is applied, the resistance is reduced. The potential at the junction of the sensing device 30 and resistor 32 is applied to the base electrode of transistor 45 to control the conduction thereof. The transistor 45 provides current through resistor 46 connected in the collector-emitter circuit thereof so that the voltage across resistor 46 varies with the radiation. The voltage across resistor 46 is applied through resistor 48 to the input terminal 51 of operational amplifier 50. A bias voltage derived from potentiometer 52, which is connected between conductor 34 and ground, is applied through resistor 53 to the input terminal 51 of the operational amplifier. A reference voltage is applied to the second input terminal 55 of the operational amplifier by the connection through resistor 56 to ground. The regulated supply potentials on conductors 34 and 35 are also applied to the amplifier 50.

The operational amplifier 50 may be of known construction and, for example, may be Model 1507 solid state DC operational amplifier manufactured by the Burr-Brown Research Corporation, Tucson, Ariz. Diode 58 is connected from the output of the amplifier 50 to the input terminal 51 to clamp the output voltage to the input voltage when the amplifier is not conducting. When the input voltage reaches a prescribed value, such as 1.5 volts, the amplifier is saturated to provide a potential through resistor 59 to the silicon controlled rectifier 60.

The operational amplifier conducts rapidly to provide very fast turn on of the silicon controlled rectifier.

The silicon controlled rectifier 60 is connected in series with relay winding 62 to the positive supply potential at terminal 38 through on-off switch 61 and contacts 21 of reset relay 20. Accordingly, when the on-off switch 61 and the relay 20 are operated, and the controlled rectifier 60 is rendered conducting, relay 62 will be actuated to close contacts 63 thereof. These contacts complete a circuit in the welding current supply to actuate the same to turn off the flow of welding current to the welding electrode 10. It is pointed out that this turn off may provide either a gradual decrease in welding current or a relatively abrupt turn off, as may be desired depending on the materials being welded.

When the welding current supply is turned off, relay 20 will release to open contacts 21. This removes the potential on silicon controlled rectifier 60 to reset the same. When the welding current supply is then actuated to make the next spot weld, relay 20 responds to the flow of welding current to close contacts 21. This completes the direct curent actuating circuit through the silicon controlled rectifier 60 for the next automatic operation.

The operation of the system of FIG. 1 is illustrated in FIG. 2. When the arc-spot welding cycle is started, the flow of current may increase gradually to a fixed level, indicated in FIG. 2 as level $a$. The welding current will continue until the system responds to the radiation and operates relay 62. This time is represented by the point $b$ on the time axis in FIG. 2. The welding current supply will then start to turn off the welding current and this may be turned off in any desired manner. When welding high strength materials, it may be desired to decrease the welding current gradually, as shown by the final portion of the cycle in FIG. 2. Any particular desired shape of the decay of the welding current can be provided by the welding current supply in a known manner.

The system of the invention has been found to be very effective to automatically control the weld penetration in a spot welding system. The system is relatively simple and is not critical of adjustment. The sensing device has a removable back up plug which can be replaced at low cost to thereby hold the maintenance cost of the equipment to a minimum.

I claim:

1. In an arc-spot welding system wherein an electrode is positioned with respect to a workpiece for making an arc-spot weld thereon, and welding current is supplied to the electrode by a controlable welding current supply, an automatic system for controling the welding current supply in accordance with weld penetration including in combination, a base for supporting the workpiece, said base having an opening therein at the position of the arc-spot weld, a removable back up plug in said opening engaging the workpiece, said back up plug having an aperture therein through which radiation from the weld can pass, radiation sensing means supported by said base for sensing radiation from the weld which passes through said aperture, and a control circuit connected to said radiation sensing means and to the welding current supply, said control circuit including means responsive to the signal developed by said radiation sensing means and providing a control voltage when said signal reaches a predetermined amplitude, and output circuit means connected to the welding current supply and responsive to said control voltage for actuating the welding current supply to turn off the flow of welding current to said electrode.

2. A system in accordance with claim 1 wherein said radiation sensing means is an optical sensing device responsive to infrared radiation.

3. A system in accordance with claim 1 including means forming a mirror positioned in said opening in said base plate and spaced from said back up plug, with said mirror directing radiation received through said aperture in said back up plug onto said radiation sensing means.

References Cited

UNITED STATES PATENTS

| | | | |
|---|---|---|---|
| 2,223,177 | 11/1940 | Jones | 314—63 |
| 2,233,617 | 3/1941 | Lamb | 219—110 |
| 2,942,097 | 6/1960 | Baas | 219—110 |
| 3,015,022 | 12/1961 | Bowers | 219—127 |
| 3,240,913 | 3/1966 | Schubert | 219—60 |
| 3,299,250 | 1/1967 | Vilkas et al. | 219—131 |

JOSEPH V. TRUHE, Primary Examiner

R. F. STAUBLY, Assistant Examiner

U.S. Cl. X.R.

219—110, 131; 314—63